(12) United States Patent
Biro et al.

(10) Patent No.: US 7,886,665 B2
(45) Date of Patent: Feb. 15, 2011

(54) METHOD OF MANUFACTURING OF LOW-ODOR PACKAGING MATERIALS

(75) Inventors: David A. Biro, Rockaway, NJ (US); John M. Rooney, Basking Ridge, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 98 days.

(21) Appl. No.: 10/591,336

(22) PCT Filed: Mar. 31, 2005

(86) PCT No.: PCT/US2005/010649
§ 371 (c)(1),
(2), (4) Date: Aug. 31, 2006

(87) PCT Pub. No.: WO2005/097495
PCT Pub. Date: Oct. 20, 2005

(65) Prior Publication Data
US 2007/0178246 A1    Aug. 2, 2007

(51) Int. Cl.
*B41M 5/00* (2006.01)
(52) U.S. Cl. .................................. 101/483; 427/493
(58) Field of Classification Search ................ 428/204, 428/195.1, 458; 427/493, 494; 101/483
See application file for complete search history.

(56) References Cited
U.S. PATENT DOCUMENTS

| 3,552,986 | A | * | 1/1971 | Bassemir et al. ............ 427/500 |
| 4,113,895 | A | | 9/1978 | Watt et al. |
| 5,407,708 | A | * | 4/1995 | Lovin et al. ................. 427/493 |
| 6,528,127 | B1 | * | 3/2003 | Edlein et al. ................ 427/494 |
| 6,803,112 | B1 | * | 10/2004 | Chatterjee et al. ........... 428/458 |
| 2002/0119295 | A1 | * | 8/2002 | Speer et al. ................. 428/195 |
| 2003/0170576 | A1 | * | 9/2003 | Fukui ........................ 430/618 |
| 2003/0180507 | A1 | * | 9/2003 | Ohman et al. ............ 428/195.1 |
| 2005/0019533 | A1 | * | 1/2005 | Mossbrook et al. ......... 428/204 |

FOREIGN PATENT DOCUMENTS

| WO | WO-97/19763 | 6/1997 |
| WO | WO-02/051915 | 7/2002 |
| WO | WO-02/081576 | 10/2002 |

* cited by examiner

*Primary Examiner*—Cynthia H Kelly
*Assistant Examiner*—Chanceity N Robinson
(74) *Attorney, Agent, or Firm*—Dickstein Shapiro LLP

(57) ABSTRACT

The present invention provides a method for producing a low-odor, printed packaging material and the printed packaging material produced thereby. The printed packaging material of the present invention is especially suitable for packaging of substances, such as food, drugs and tobacco, which require low odor from printing inks. In this process, the printed ink is activated by exposure to actinic radiation, such as UV light, before an actinic-radiation curable coating is applied thereto. The exposure of the printed ink to UV light reduces residual solvent content and odor of the packaging material and improves the friction resistance and gloss of the printed images. Furthermore, the exposure of the printed packaging material to UV light provides an additional benefit of reducing microbial count, thereby extending a shelf-life of the packaged substance, such as food and drugs.

20 Claims, No Drawings

METHOD OF MANUFACTURING OF LOW-ODOR PACKAGING MATERIALS

1. FIELD OF THE INVENTION

This invention relates to a process of producing low-odor packaging materials utilizing actinic radiation-activatable solvent- or water-based liquid inks and an actinic radiation-curable coating, which provides ink protection and gloss enhancement of packaging.

2. BACKGROUND OF THE INVENTION

Organic solvent- and/or water-based liquid flexo or gravure inks ("solvent-based printing inks") have been widely used in various types of printing, such as packaging, using inkjet printer. The printed images should have good solvent and abrasion resistance. At the same time, it is necessary for solvent-based printing inks to have good re-solubility to avoid ink drying and clogging on the plate, anilox and gravure cylinders of the printers. Typically, low molecular weight (MW) resins and plasticizers offer good re-solubility, yet, in order to improve resistance properties of the printed images, higher MW resins are required. This represents a major contradiction and problem for the formulators of the solvent-based packaging liquid inks.

To solve these problems, various types of photocurable printing inks having specific combinations of photocurable resins and photoinitiators, have been developed (see, for example, U.S. Pat. Nos. 4,066,582; 4,221,686; 4,303,924; 5,057,398; and WO 01/57145 A1). However, incomplete polymerization of these inks often results in diffusion of uncured resins and causes smears or abrasion of the printed images.

As pointed out in U.S. Pat. No. 6,528,127, the printing of thermoplastic packaging films has remained a bit of a black art despite advances in general printing techniques. Packagers have recently been requiring film manufacturers to provide packaging films bearing photograph quality printed images, which is difficult in and of itself, sometimes for uses which add to the difficulty. Heat shrinkable films and thermoforming films are particularly challenging because of the need for the printing ink(s) to resist cracking or flaking off once the film has undergone heat shrinking, a process during which the film is subjected to heat, friction, and/or film-to-metal contact. Films intended for cook-in applications can undergo all of these strenuous conditions and provide film manufacturers and converters with some of their greatest printing challenges.

To prevent cracking and/or flaking of printed images, film manufacturers tried several strategies. Most often, these involve the use of new ink formulations to avoid using standard inks containing pigments carried in a resin which is soluble in a solvent such as an alcohol which must be evaporated, leaving behind the resin-pigment combination. The newer formulations have involved two-part polyurethane resin systems as well as solvent-free systems in which the resin(s) can be cured by means of ultraviolet (UV) light, which also have drawbacks, including concerns regarding operator exposure to components and the need to assure sufficient cross-linking to comply with applicable governmental food safety regulations.

To solve these problems, U.S. Pat. No. 6,528,127 teaches a manufacturing process for food packaging materials comprising printing the plastic film with solvent-based inks which are dried without electron beam or ultraviolet radiation, followed by applying a radiation-curable, pigment-free protective coating and radiation curing the coating. In this process that represents an advance, it has been found that an excessive amount of residual solvent is trapped in the ink under the protective coating and causes excessive odor from the packaging material. In addition, since drying rate of solvent varies significantly over multiple heating units as well as the number and amount of ink traps, the cure and friction characteristics of the finished packaging material can be non-uniform throughout the printed images. This, in turn, can cause problems with processing the packaging material in the filling lines, particularly in relation to coefficient of friction (COF, which represents frictional resistance between two surfaces and can be expressed as static COF, where the surfaces are static, and kinetic COF, where the surfaces are in motion) and/or slipping issues. For example, a job printed at a customer with three solvent based inks on the polyethylene (PE) film and over-printed with electron-beam (EB) curable coating, has the following coating-crosslinking cure patterns: (i) coating over PE film—30 MEK (methyl ethyl ketone) rubs (see the definition below); (ii) coating over white ink—8-10 MEK rubs; (iii) coating over yellow and white inks—3-4 MEK rubs; and (iv) coating over black, yellow and white inks—only 1 MEK rub. Thus, the EB coating cures differently over different color inks primarily because the solvent-based inks release their solvent differently. The thicker the underlying ink layer, the slower the cure of the overlaying energy-curable coating. Variations in degree of cure result in variations in COF value. Thus, there is a need for a printing method for, in particular, food packaging, that addresses these problems while providing an imaged film with the desired characteristics.

3. SUMMARY OF THE INVENTION

The present invention is based, partly, on the discovery by the present inventors that by activating a printed actinic-radiation activatable solvent- or water-based inks on packaging materials with actinic radiation before applying the protective coating reduces the residual solvent content and odor as well as improves the friction resistance and gloss of the printed images. The term "actinic-radiation activatable ink" used herein means that the ink is substantially free of curable functionality (i.e., functional groups that can be cross-linked or polymerizable). Accordingly, the present invention provides a method of producing a coated packaging material comprising printing on a packaging material with an actinic radiation activatable liquid ink, actinic-radiation activating the ink, applying a protective coating over the activated ink, and curing the coating by exposure to ionizing radiation.

The term "actinic radiation" used herein refers to its broadest sense as any radiation that can produce photochemical reactions.

In a preferred embodiment, the actinic radiation for activating the liquid ink is UV light. In another preferred embodiment, the actinic radiation for curing the protective coating is an electron beam (EB).

In a specific embodiment, the packaging material is plastic film or a plastic film laminate structure. In another specific embodiment, the packaging material is a foil-laminated plastic structure, or a paper plastic laminate. In yet another specific embodiment, the ink is solvent based. In another specific embodiment, the ink is water based. The present invention further provides a low odor packaging material produced by the method of the present invention. In a preferred embodiment, the packaging material of the present invention contains residual solvent or water after UV exposure of less than about 700 ppm total, more preferably less than about 600 ppm total, and most preferably less than about 400 ppm. In another preferred embodiment, the packaging material of the present invention has a degree of cure, as measured by solvent rubs, of at least 5 MEK (methyl ethyl ketone) rubs, more preferably at least 10 MEK rubs, and most preferably at least 20 MEK rubs.

The MEK test is a solvent rub technique using a methyl ethyl ketone for assessing the solvent resistance of an organic coating that chemically changes during the curing process (for details, see ASTM D5402-93; "Assessing the Solvent Resistance of Organic Coatings Using Solvent Rubs" in Annual Book of ASTM, 1999, by West Conshohocken, Pa.). The MEK resistance is expressed as a number of MEK rubs, using a MEK saturated cotton ball or cotton-tipped swab, to which the coating can stand without any loss of the coating and it generally correlates with a degree of cure of the coating. The MEK resistance is also influenced by temperature, film thickness, air movement and relative humidity.

The printed packaging material prepared according to the present invention has a broad range of applications, including, but not limited to, food packaging, drug packaging, tobacco packaging, and any other packaging which requires printing thereon.

4. DETAILED DESCRIPTION OF THE INVENTION

The present invention provides a method of manufacturing low odor packaging materials comprising printing on a packaging material with a solvent- or water-based, actinic-radiation activatable printing ink, exposing the ink to first actinic radiation, applying energy-curable coating over the ink, and curing the coating by exposure to second actinic radiation, preferably an electron beam. In a preferred embodiment, the first actinic radiation to activate the solvent-based printing ink is UV light emitted by a UV lamp. In this method, the heat and activity induced by the UV lamp help to remove residual solvent, which would be otherwise trapped under the EB coating and cause odor and migration of the printed ink. Furthermore, UV light is anti-microbial and reduces microbial counts in the packaging material, extending shelf life of packaged food. Thus, the present invention further provides a low-odor packaging material produced by the method of the present invention. The printed images of the packaging material of the present invention can stand strenuous conditions, such as heat and friction, during subsequent filling steps of the packaging with a substance to be packaged.

4.1 Packaging Materials

Packaging materials to be used in the present invention should be capable of achieving good preservation of their contents (e.g., food, drugs, tobacco, etc.) and safety, and include, but are not limited to, various thermoplastic flexible packaging films (single layer as well as multilayer plastic films), foil-laminated plastic structure, a paper plastic laminate and a plastic/foil/paper laminates, all of which are well known to those skilled in the art. Appropriate thermoplastic flexible packaging films to be used in the present invention include, but not by way of limitation, polyester, polypropylene, nylon, polyolefin, various homopolymers, copolymers, and or interpolymers, of polystyrene, polyisoprene, 1,2- or 1,4-polybutadinene, poly(meth)acrylic acid, polymethyl methacrylate, polyethylene oxide, polybutylene oxide, poly 2-vinylpyridine, polydiethylamino ethylmethacrylate, poly dimethylamino ethylmethacrylate, and so forth. The film may incorporate a gas barrier component, such as ethylene vinyl alcohol, polyvinylidene chloride, nylon, polyacrylonitrile, polysilicate, melamine, polyhydroxy ethers (e.g., Blox® by Dow), and so forth. Various packaging materials are described in U.S. Pat. Nos. 6,815,057, 6,846,530, 6,846,532, 6,866,907 and 6,861,478, each of which is incorporated by reference in its entirety. Paper plastic laminates are described in U.S. Pat. No. 6,843,371 and U.S. patent application publication no. 2005/0031887 and examples of foil-laminated plastic structure can be found in U.S. Pat. Nos. 4,402,172, 5,098,751, 6,716,499 and 5,800,724, all of which are incorporated by reference in their entireties.

4.2 Organic Solvent- and/or Water-Based Ink

The organic solvent- and/or water-based inks used in the present invention are any polymers or resins well known to one of ordinary skill in the art. The term "resin" used herein in relation to organic solvent- and/or water-based inks refers to both homopolymers and copolymers known as hard solid polymers. Preferably, such resins have relatively low weight average molecular weight (Mw). The preferred Mw is greater than about 500 but less than about 500,000 daltons, more preferably greater than about 1,000 but less than about 50,000 daltons, and most preferably greater than about 1,000 but less than about 10,000 daltons. The resins preferably have melting points at temperatures between about 0° and about 200° C., more preferably between about 10° C. and about 180° C., and most preferably between about 20° C. and 150° C. Examples of useful organic solvent- and/or water-soluble polymer resin includes, but not limited to, natural polymers, such as rosin based resins, cellulosic resins, such as nitrocellulose, carboxymethyl cellulose and ethyl hydroxyethyl cellulose; and synthetic polymers, such as polyamides, polyvinyl esters, polyvinyl acetals, polyvinyl ethers, epoxide resins, polyacrylic acid esters, polymethacrylic acid esters, polyesters, alkyd resins, polyacrylamide, polyvinyl alcohol, polyethylene oxide, polydimethyl acrylamide, polyvinyl pyrrolidone, polyvinylmethyl formamide, polyvinyl methyl acetamide, polyether polyurethane, aliphatic and aromatic polyurethane, polystyrene resin, styrene-maleic anhydride copolymer (SMA), styrene-(meth)acrylate ester copolymer resin or styrene-conjugated diene copolymer resin, butyral resin, xylene resin, coumarone-indene resin, phenolic resin, as well as a mixture of or copolymer of those listed above.

In a preferred embodiment, an organic solvent- and/or water-soluble polymer is in a range between about 0.1% and about 40% by weight of the total ingredients of the ink, more preferably between about 1% and about 30% by weight of the total ink, and most preferably between about 10% and about 20% by weight of the total ink.

The printed images are then irradiated by actinic radiation which activates the printed inks. In a preferred embodiment, actinic radiation is UV light from a UV lamp. An appropriate UV light may be obtained from, for example, a medium pressure mercury lamp, a metal halide lamp, a xenon lamp, a carbon arc light source, a chemical lamp, low-pressure or high-pressure mercury lamp, a UV-light emitting diode (LED) lamp and so forth. The appropriate UV light intensity is in the range of about 20 to about 10,000 mJ/cm$^2$, preferably about 40 to about 1,000 mJ/cm$^2$, and most preferably about 50 to about 700 mJ/cm$^2$. It should be noted that the organic solvent- and/or water-based inks used in the present invention do not contain any photoinitiator even when the first actinic radiation to activate the liquid ink is UV light.

In another preferred embodiment, actinic radiation is an electron beam between about 0.5 to about 8 Mrads, more preferably about 1 to about 6 Mrads, and most preferably about 1.3 to about 4 Mrads. An electron beam acceleration voltage ranges preferably about 30-200 kV, more preferably 60-165 kV, and most preferably about 70-140 kV. During the irradiation of the printed ink, an inert environment is preferably provided by, for instance, nitrogen gas, resulting in preferably less than about 600 parts per million (ppm), more preferably less than about 400 ppm, and most preferably less than about 200 ppm, of $O_2$ present in the environment.

4.3 Ink Vehicle

Any vehicle which has previously been used in printing inks may be used for the present invention. Typical are solvents that are low in viscosity and compatible with any other components of the ink. Thus, a choice of solvents depends on the types of the resin components selected for the printing ink of the present invention. Usable solvents for the present printing ink include, but not by way of limitation, water; alcohols, such as ethanol, methanol, isopropanol and n-butanol; esters, such as ethyl acetate, isopropyl acetate, butyl acetate (BuAc) and 2-ethoxyethyl acetate; glycol-ethers, such as 2-methoxyethanol, 2-ethoxyethanol, 2-butoxyethanol, 2-methoxyethoxethanol, 2-ethoxyethoxethanol and 2-butoxyethoxethanol; aliphatics, such as VM&P Naptha and mineral spirits; aromatics, such as toluol and xylol; ketones, such as acetone, methyl ethyl ketone (MEK) and methyl isobutyl ketone (MIBK) and other solvents, such as methylene chloride, 1,1,1-trichloroethane, N-methyl-2-pyrrolidone, dimethylsulfoxide, mesityl oxide, dimethyl formamide, thiophene, and so forth.

In a preferred embodiment, water and/or low molecular weight aliphatic alcohol, such as methanol, ethanol and isopropyl alcohol, or ester, such as ethyl acetate, may be used. In a preferred embodiment, the vehicle is in a range between about 1% and about 90%, more preferably about 30% and 85%, and most preferably about 45% and about 75%, by weight of the total weight of the printing ink.

4.4 Energy-Curable Resin

The energy curable resin or photocurable or photopolymerizable resin to be used as protective coating in the present invention may be selected from the broad range of ethylenically unsaturated monofunctional or polyfunctional monomers and oligomers derived therefrom, capable of undergoing photopolymerization (see U.S. Pat. No. 4,066,582; JP H1-115974; WO 01/57145; WO 03/093378; and U.S. Pat. No. 6,706,777). The term "oligomer" as used herein refers to a low molecular weight polymer with degree of polymerization (DP) of less than about 10. Examples of suitable monomers are (poly)ester(meth)acrylates having at least one ester bond in the main chain; urethane(meth)acrylates having at least one urethane bond in the main chain; epoxyacrylates obtained by a reaction between (meth)acrylic acid and epoxide with one and more than one functional groups; (poly)ether(meth)acrylates having at least one ether bond in the main chain; alkyl(meth)acrylates or alkylene(meth)acrylates comprising the main chain formed by a linear alkyl, a branched alkyl, a linear alkylene or a branched alkylene, and side chains or terminal ends having halogen atoms and/or hydroxyl groups; (meth)acrylates having an aromatic ring at the main chain or the side chain; (meth)acrylates having an alicyclic group having, in the main chain or the side chain, alicyclic groups which may include oxygen atoms or nitrogen atoms as the structural unit; and the like. It will be understood that "(meth)acrylate" is being used in its conventional sense to reference both acrylate and methacrylate.

Examples of (poly)ester(meth)acrylates include, but are not limited to, monofunctional (poly)ester(meth)acrylates such as alicyclic-modified neopentylglycol(meth)acrylate, caprolactone-modified 2-hydroxyethyl(meth)acrylate, ethyleneoxide- and/or propyleneoxide-modified phthalate(meth)acrylate, ethyleneoxide-modified succinate(meth)acrylate, caprolactone-modified tetrahydrofurfuryl(meth)acrylate; pivalate-esterneopentylglycoldi(meth)acrylate, caprolactone-modified hydroxypivalateesterneopentylglucoldi(meth)acrylate, epichlorohydrin-modified phthalatedi(meth)acrylate; mono-, di- or tri-(meth)acrylates of triol obtained by addition of more than 1 mole of cyclic lactones such as epsilon-caprolactone, gamma-butylolactone, delta-valerolactone or methylvalerolactone to 1 mole of trimethylolpropane or glycerin; mono-, di-, tri, or tetra-(meth)acrylates of triol obtained by addition of more than 1 mole of cyclic lactones such as epsilon-caprolactone, gamma-butylolactone, delta-valerolactone or methylvalerolactone to 1 mole of pentaerythritol or ditrimethylolpropane; mono- or poly-(meth)acrylates of polyhydric alcohols such as triol, tetraol, pentanol, or hexanol, obtained by addition of more than 1 mole of cyclic lactones such as epsilon-caprolactone, gamma-butylolactone, delta-valerolactone or methylvalerolactone to 1 mole of dipentaerythritol; (meth)acrylates of polyester polyols composed of diol components, such as (poly)ethylene glycol, (poly)propylene glycol, (poly)tetramethylene glycol, (poly)butylene glycol, (poly)pentanediol, (poly)methyl-pentanediol, and (poly)hexanediol, and polybasic acids such as maleic acid, fumaric acid, succinic acid, adipic acid, phthalic acid, hexahydrophthalic acid, tetrahydrophthalic acid, itaconic acid, citraconic acid, hettic acid, chlorendic acid, dimeric acid, alkenylsuccinic acid, sebacic acid, azelaic acid, 2,2,4-trimethyladipic acid, 1,4-cyclo-hexanedicarboxylic acid, terephthalic acid, 2-sodium-sulfoterephthalic acid, 2-potassium sulfoterephthalic acid, isophthalic acid, 5-sodium sulfoisophthalic acid, 5-potassium sulfoisophthalic acid, orthophthalic acid, 4-sulfophthalic acid, 1,10-decamethylenedicarboxylic acid, muconic acid, oxalic acid, malonic acid, gultaric acid, trimellitic acid, pyromellitic acid; and polyfunctional (poly)ester (meth)acrylates composed of the above diol components, polybasic acids, and cyclic lactone-modified polyesterdiols such as epsilon-caprolactone, gamma-butylolactone, delta-valerolactone or methylvalerolactone.

Urethane(meth)acrylates represent (meth)acrylates obtained by a reaction between hydroxy compounds having at least one acryloyloxy group and isocyanate compounds. Urethane(meth)acrylate may also be selected from water dilutable aliphatic acrylate or aromatic urethanes. Examples of hydroxy compounds having at least one acryloyloxy group include, for example, 2-hydroxyethyl(meth)acrylate, 2-hydroxypropyl(meth)acrylate, 2-hydroxybutyl(meth)acrylate, 3-hydroxybutyl(meth)acrylate, 4-hydroxybutyl(meth)acrylate, cyclohexanedimethanolmono(meth)acrylate, polyethylene glycol(meth)acrylate, polypropylene glycol(meth)acrylate, trimethylolpropanedi(meth)acrylate, trimethylolethanedi(meth)acrylate, pentaerythritoltri(meth) acrylate or an adduct of (meth)acrylate with glycidyl(meth)acrylate, (meth)acrylate compounds having hydroxyl groups such as 2-hydroxy-3-phenolpropyl(meth)acrylate, and ring-opening reaction products of the above acrylate compounds having hydroxyl groups with epsilon-caprolactone.

Examples of isocyanate compounds include, for example, aromatic diisocyanates such as p-phenylenediisocyanate, m-phenylenediisocyanate, p-xylenediisocyanate, m-xylenediisocyanate, 2,4-tolylenediisocyanate, 2,6-tolylenediisocyanate, 4,4'-diphenylmethanediisocyanate, 3,3'-dimethyldiphenyl-4,4'-diisocyanate, 3,3'-diethyldiphenyl-4,4'-diisocyanate, and naphthalenediisocyanate; aliphatic or alicyclic diisocyanates, such as isophoronediisocyanate, hexamethylenediisocyanate, 4,4'-dicyclohexylmethanediisocyanate, hydrogenated xylenediisocyanate, norbornenediisocyanate, and lysinediisocyanate; polyisocyanates, such as buret products of more than one type of isocyanates and isocyanate-trimers of the above isocyanates; and polyisocyanates obtained by the esterification reaction of the above isocyanate with various polyols. Examples of polyols used to produce polyisocyanates include, but are not limited to, (poly)alkylene glycols such as (poly)ethylene glycol, (poly)propylene glycol, (poly)butylene glycol, and (poly)tetramethylene glycol; alkyleneglycols modified by ethyleneoxide, proxyleneoxide, butyleneoxide, tetrahydrofuran, epsilon-carprolactone, gamma-butylolactone, delta-varlerolactone or methylvalerolactone, such as ethylene glycol, propanediol, propylene glycol, tetramethylene glycol, pentamethylolpropane, hexanediol neopentyl glycol, glycerin, trimethylolpropane, pentaerythriol, diglycerin, ditrimethylolpropane, and dipentaerythritol; aliphatic polyols such as copolymers of ethyleneoxide and propyleneoxide, copolymers of propylene glycol and tetrahydrofuran, copolymers of ethylene glycol and tetrahydrofuran, polyisoprene glycol, hydrogenated polyisoprene glycol, polybutadiene glycol, and hydrogenated polybutadiene glycol; aliphatic polyester polyols obtained by esterification reactions between aliphatic dicarboxylic acids such as adipic acid and dimeric acid with polyols such as neopentyl glycols and methpentanediol; aromatic polyester polyols obtained by esterification reaction between aromatic dicarboxylic acids, such as terephthalic acid with polyols, such as neopentyl glycol; polycarbonatepolyols; acrylpolyols; polyhydric alcohols, such as polytetrameththlenehexaglyceryl ether (hexaglycerin modified by tetrahydrofuran); mono- or polyhydric compounds having an ether group at a terminal; polyhydric compound obtained by esterification of the compound having polyhydroxyl groups with dicarboxylic acids, such as fumaric acid, phthalic acid, isophthalic acid, itaconic acid, adipic acid, sebacic acid, and maleic acid; compound containing polyhydroxyl groups such as monoglyceride obtained by transesterification reaction of compound having polyhydroxyl groups such as glycerin with ester of fatty acid of animals or plants.

Epoxy(meth)acrylates are obtained by a reaction of epoxides having more than one functional group and (meth) acrylic acid. Epoxides as the raw material for epoxy(meth) acrylates includes, but are not limited to, epichlorhydrin-modified-hydrogenated bisphenol-type epoxy resin, synthesized by (methyl)epichlorohydrin and compounds such as hydrogenated bisphenol A, hydrogenated bisphenol S, hydrogenated bisphenol F, and their modified compounds with ethylene oxide or propylene oxide; alicyclic epoxy resins such as 3,4-epoxycyclohexylmethyl-3,4-epoxycyclo hexane carboxy-late, bis-(3,4-epoxycyclohexyl)adipate; alicyclic epoxies such as epoxy resin containing heterocycles such as triglycidylisocyanurate; epichlorohydrin-modified bisphenol-type epoxy resins synthesized by a reaction of (methyl)epichlorohydrin and a compound such as bisphenol A, bisphenol S, bisphenol F, and their modified compounds with ethylene oxide or propyleneoxide; phenol Novolak type epoxy resins; cresol Novolak type epoxy resins; epoxy resins of dicyclopentadiene-modified phenol resin obtained by the reaction of dicyclopentadiene and various types of phenol resins; an aromatic epoxidized compounds of 2,2',6,6'-tetramethylbis-phenol; aromatic epoxides such as phenylglycidyl ether; (poly)glycidyl ethers of glycol compounds such as (poly)ethylene glycol, (poly)propylene glycol, (poly)butylene glycol, (poly)tetramethylene glycol, neopentyl glycol; (poly)glycidyl ether of glycols modified with alkylene oxide; (poly)glycidyl ethers of aliphatic polyhydric alcohols, such as trimethylolpropane, trimethylolethane, glycerin, diglycerin, erythritol, pentaerythritol, sorbitol, 1,4-butanediol, 1,6-hexanediol; alkylene type epoxides of (poly)glycidyl ether modified of aliphatic polyhydric alcohols by alkylene; glycidylesters of carboxylic acids, such as adipic acid, sebacic acid, maleic acid, and itaconic acid; glycidyl ethers of polyesterpolyols of polyhydric alcohols with polycarboxylic acids; a copolymer of glycidyl(meth)acrylate or methylglycidyl(meth)acrylate; glycidylester of higher fatty acids; aliphatic epoxy resins, such as an epoxidized linseed oil, an epoxidized castor oil, and an epoxidized polybutadiene.

(Poly)ether(meth)acrylates include, but are not limited to, aliphatic epoxy acrylates, monofunctional (poly)ether(meth) acrylates, such as butoxyethyl(meth)acrylate, butoxytriethylene glycol(meth)acrylate, epichlorohydrin-modified butyl (meth)acrylate, dicyclopentenyloxyethyl(meth)acrylate, 2-ethoxyethyl(meth)acrylate, ethylcarbitol(meth)acrylate, 2-methoxy(poly)ethylene glycol(meth)acrylate, methoxy (poly)propylene glycol(meth)acrylate, nonylphenoxypolyethylene glycol(meth)acrylate, nonylphenoxypolypropylene glycol(meth)acrylate, phenoxyhydroxypropyl(meth)acrylate, phenoxy(poly)ethylene glycol(meth)acrylate, polyethylene glycol mono(meth)acrylate, polypropylene glycol mono(meth)acrylate, and polyethylene glycol, polypropylene glycol mono(meth)acrylate; alkylene glycol di(meth) acrylates such as polyethylene glycol di(meth)acrylate, polypropylene glycol di(meth)acrylate, polybutylene glycol di(meth)acrylate, polytetramethylene glycol di(meth)acrylate; polyfunctional (meth)acrylates induced by (meth) acrylic acid with aliphatic polyols, such as a copolymer of ethylene oxide and propylene oxide, a copolymer of propylene glycol and tetrahydrofuran, a copolymer of ethylene glycol and tetrahydrofuran, polyisoprene glycol, hydrogenated polyisoprene glycol, polybutadieneglycol, hydrogenated polybutadiene glycol; polyfunctional (meth)acrylates induced by acrylic acid with polyhydric alcohols such as polytetramethylenehexaglyceryl ether (tetrahydrofuran-modified hexaglycerin); di(meth)acrylates of diol obtained by addition of equimolar or more than 1 mole of cyclic ethers, such as ethylene oxide, propylene oxide, butylene oxide and/or tetrahydrofuran to 1 mole of neopentyl oxide; di(meth) acrylates of alkylene oxides-modified bisphenols, such as bisphenol A, bisphenol F and bisphenol S; di(meth)acrylate of alkylene oxide-modified hydrogenated bisphenols, such as hydrogenated bisphenol A, hydrogenated bisphenol F, hydrogenated bisphenol S; di(meth)acrylates of alkylene oxide-modified trisphenols; di(meth)acrylates of alkylene oxide-modified hydrogenated trisphenols; di(meth)acrylates of alkylene oxide-modified p,p'-bisphenols; di(meth)acrylates of alkylene oxide-modified hydrogenated bisphenols; di(meth)acrylates of alkylene oxide-modified p,p'-dihydroxybenzophenones; mono-, di-, and tri-(meth)acrylates of triols obtained by addition of equimolar or more than 1 mole of ethylene oxide, propylene oxide, butylene oxide, and/or cyclic ethers such as tetrahydrofuran to 1 mole of trimethylolpropane or glycerin; mono-, di-, tri- or tetra-(meth)acrylates obtained by addition of equimolar or more than 1 mole of ethylene oxide, propylene oxide, butylene oxide, and/or cyclic ethers, such as tetrahydrofuran to 1 mole of pentaerythritol, ditrimethylolpropane or highly alkoxylated trimethylolpropane triacrylate; monofunctional (poly)ether(meth)acrylates or polyfunctional (poly)ether(meth)acrylates of polyhydric alcohols such as triol, tetraol, pentanol, or hexanol of mono- or poly-(meth)acrylates obtained by addition of equimolar or more than 1 mole of ethylene oxide, propylene oxide, butylene oxide, and/or cyclic ethers, such as tetrahydrofuran to 1 mole of dipentaerythritol.

Alkyl(meth)acrylates or alkylene(meth)acrylates include, but are not limited to, monofunctional (meth)acrylates, such as methyl(meth)acrylate, ethyl(meth)acrylate, propyl(meth) acrylate, isopropyl(meth)acrylate, butyl(meth)acrylate, isobutyl(meth)acrylate, pentyl(meth)acrylate, isopentyl (meth)acrylate, neopentyl(meth)acrylate, hexyl(meth)acrylate, heptyl(meth)acrylate, 2-ethylhexyl(meth)acrylate, octyl (meth)acrylate, isooctyl(meth)acrylate, nonyl(meth)acrylate, decyl(meth)acrylate, dodecyl(meth)acrylate, tridecyl (meth) acrylate, pentadecyl(meth)acrylate, miristyl(meth)acrylate, palmityl(meth)acrylate, stearyl(meth)acrylate, neryl(meth) acrylate, geranyl(meth)acrylate, farnecyl(meth) acrylate, hexadecyl(meth)acrylate, octadecyl(meth)acrylate, dodecyl (meth)acrylate, and trans-2-hexene(meth)acrylate; di(meth) acrylates of aliphatic diols such as ethylene glycol di(meth) acrylate, propylene glycol di(meth)acrylate, 1,2-butylene glycol di(meth)acrylate, 1,3-butylene glycol di(meth)acrylate, 1,4-butanediol di(meth)acrylate, 1,6-hexanediol di(meth)acrylate, neopentyl glycol di(meth) acrylate, 2-methyl-1,8-octanediol di(meth)acrylate, 1,9-nonanediol di(meth)acrylate, and 1,10-decanediol di(meth) acrylate; mono(meth)acrylates or poly(meth)acrylates of polyhydric alcohols such as trimethylolpropane, (hereinafter, the term "poly" is used as the general term of the poly-functional including di, tri, tetra, and poly compounds such as mono (meth)acrylate, di(meth)acrylate, and tri(meth)acrylate of trimethylolpropane), and mono(meth)acrylates or poly(meth) acrylates of polyhydric alcohols, such as triol, tetraol, and hexanol, for example, glycerin, pentaerythritol, ditri-methylolpropane, and dipentaerythritol; (meth)acrylates having hydroxyl groups such as 2-hydroxyethyl(meth)acrylate, 2-hydroxypropyl(meth)acrylate, 4-hydroxybutyl(meth)acrylate, 3-chloro-2-hydroxyethyl(meth)acrylate; (meth)acrylates having bromine atoms such as 2,3-dibromopropyl (meth)acrylate, tribromophenyl(meth)acrylate, ethylene oxide-modified tribromophenyl(meth)acrylate, ethylene oxide-modified tetrabromobisphenol A di(meth)acrylate; (meth)acrylates having fluorine atoms such as trifluoroethyl (meth)acrylate, pentafluoropropyl(meth)acrylate, tetrafluoropropyl(meth) acrylate, octafluoropentyl(meth)acrylate, dodecafluoroheptyl(meth)acrylate, hexadecafluorononyl (meth)acrylate, hexafluorobutyl(meth)acrylate, 3-perfluorobutyl-2-hydroxypropyl(meth)acrylate, 3-perfluorohexyl-2-hydroxypropyl(meth)acrylate, 3-perfluorooctyl-2-hydroxypropyl(meth)acrylate, 3-(perfluoro-5-methylhexyl)-2-hydroxypropyl(meth)acrylate, 3-(perfluoro-7-methyloctyl)-2-hydroxypropyl(meth)acrylate, and 3-(perfluoro-8-methyldecyl)-2-hydroxypropyl(meth)acrylate.

(Meth)acrylates having aromatic groups include, for example, but are not limited to, monofunctional (meth)acrylates, such as phenyl(meth)acrylate, benzylacrylate; and di(meth)acrylates, such as bisphenol A diacrylate, bisphenol F diacrylate, bisphenol S diacrylate.

(Meth)acrylates having alicyclic groups include, but not by way of limitation, monofunctional (meth)acrylates having alicyclic structures, such as cyclohexyl(meth)acrylate, cyclopentyl(meth)acrylate, cycloheptyl(meth)acrylate, bicycloheptyl(meth)acrylate, isobornyl(meth)acrylate, bicyclopentyldi(meth)acrylate, tricyclodecyl(meth)acrylate, bicyclopentenyl(meth)acrylate, norbornyl(meth)acrylate, bicyclooctyl(meth)acrylate, tricyclooctyl(meth)acrylate, and cholesteroid skeleton-substituted(meth)acrylate; di(meth)acrylates of hydrogenated bisphenols, such as hydrogenated bisphenol A, hydrogenated bisphenol F, hydrogenated bisphenol S, di(meth)acrylates of hydrogenated trisphenols, such as hydrogenated trisphenols, and di(meth) acrylates of hydrogenated p,p'-bisphenols; polyfunctional (meth)acrylates having cyclic structures such as dicyclopentane type di(meth)acrylate, such as "Kayarad R684" (available from Nihon Kayaku Co., Japan), tricyclodecane dimethyloldi(meth)acrylate, bisphenolfluorene dihydroxy(meth) acrylate; and alicyclic acrylates having oxygen atoms and/or nitrogen atoms, such as tetrahydrofurfuryl(meth)acrylate, and morpholinoethyl(meth)acrylate.

Compounds having acryloyl groups or methacryloyl groups which are suitable for the present invention, beside the above recited compounds, include poly(meth)acryl(meth) acrylates, such as a reaction product of (meth)acrylic acid polymer and glycidyl(meth)acrylate, and a reaction product of glycidyl(meth)acrylate polymer and (meth)acrylic acid; (meth)acrylate having amino groups such as dimethylaminoethyl(meth)acrylate; isocyanul(meth)acrylates, such as tris (meth)acryloxyethyl isocyanurate; phosphagene(meth)acrylates, such as hexakis(meth)acryloyloxyethyl cyclotriphosphagen; (meth)acrylate having a skeleton of polysiloxane; polybutadiene(meth)acrylate; and melamine (meth)acrylate. Among these compounds having acryloyl or methacryloyl group, it is preferable to use the compound having 1 to 6 acryloyl or methacryloyl groups.

(Meth)acrylamide derivatives which can be used in the present invention include, for example, monofunctional (meth)acrylamides, such as N-isopropyl(meth)acrylamide; and polyfunctional (meth)acrylamides, such as methylenebis (meth)acrylamide.

Compounds having vinyl ether groups suitable for the present invention include, but are not limited to, those containing: an alkyl vinyl ether having a terminal group substituted with at least one selected from the group consisting of a hydrogen atom, a halogen atom, a hydroxyl group, and an amino group; a cycloalkyl vinyl ether having a terminal group substituted with at least one selected from the group consisting of a hydrogen atom, a halogen atom, a hydroxyl group, and an amino group; at least one vinyl ether selected from the group consisting of a monovinyl ether, a divinyl ether, and a polyvinyl ether in which a vinyl ether group is connected with alkylene group; and a vinyl ether group connected with at least one group with and without substituent selected from the group consisting of alkyl group, cycloalkyl group, and aromatic group, via at least one linkage selected from the group consisting of an ether linkage, an urethane linkage, and an ester linkage.

Alkylvinyl ethers include, but are not limited to, methyl vinyl ether, hydroxymethyl vinyl ether, chloromethyl vinyl ether, ethyl vinyl ether, 2-hydroxyethylvinylether, 2-chloroethylvinylether, diethyl aminoethyl vinyl ether, propyl vinyl ether, 3-hydroxypropyl vinyl ether, 2-hydroxypropyl vinyl ether, 3-chloropropyl vinyl ether, 3-aminopropyl vinyl ether, isopropyl vinyl ether, butyl vinyl ether, 4-hydroxybutyl vinyl ether, isobutyl vinyl ether, 4-aminobutyl vinyl ether, pentyl vinyl ether, isopentyl vinyl ether, hexyl vinyl ether, 1,6-hexanediol monovinyl ether, heptyl vinyl ether, 2-ethylhexyl vinyl ether, octyl vinyl ether, isooctyl vinyl ether, nonyl vinyl ether, isononyl vinyl ether, decyl vinyl ether, isodecyl vinyl ether, dodecyl vinyl ether, isododecyl vinyl ether, tridecyl vinyl ether, isotridecyl vinyl ether, pentadecyl vinyl ether, isopentadecyl vinyl ether, hexadecyl vinyl ether, octadecyl vinyl ether, methylene glycol divinyl ether, ethylene glycol divinyl ether, propylene glycol divinyl ether, 1,4-butanediol divinyl ether, 1,6-hexanediol divinyl ether, cyclohexanediol divinyl ether, trimethylolpropane trivinyl ether, pentaerythritol tetravinyl ether and hexanedioic acid, bis{4-ethenyloxy)butyl]ester.

Cycloalkyl vinyl ethers suitable for the present invention include, but not by way of limitation, cyclopropyl vinyl ether, 2-hydroxycyclopropyl vinyl ether, 2-chloro-cyclopropyl vinyl ether, cyclopropylmethyl vinyl ether, cyclobutyl vinyl ether, 3-hydroxycyclobutyl vinyl ether, 3-chlorocyclobutyl vinyl ether, cyclobutylmethyl vinyl ether, cyclopentyl vinyl ether, 3-hydroxycyclopentyl vinyl ether, 3-chlorocyclopentyl vinyl ether, cyclopentylmethyl vinyl ether, cyclohexyl vinyl ether, 4-hydroxycyclohexyl vinyl ether, cyclohexylmethyl vinyl ether, 4-aminocyclohexyl vinyl ether, cyclohexanediol monovinyl ether, cyclohexanedimethanol monovinyl ether, and cyclohexanedimethanol divinyl ether. Compounds containing monovinyl ethers, divinyl ethers, and/or polyvinyl ethers, include those in which the vinyl ether linkage connects with an alkylene group, and at least one group selected from a group consisting of a $C_2$-$C_{24}$ alkyl group, a $C_2$-$C_{24}$ alicyclic group and a $C_2$-$C_{24}$ aromatic group which may have a substituents connecting with a linkage selected from the group consisting of an ether linkage, an urethane linkage, and an ester linkage. Examples of the compounds containing an ether linkage include, but are not limited to, ethylene glycol methyl vinyl ether, diethylene glycol monovinyl ether, diethylene glycol methylvinyl ether, diethylene glycol divinyl ether, triethylene glycol monovinyl ether, triethylene glycol methylvinyl ether, triethylene glycol divinyl ether, polyethylene glycol monovinyl ether, polyethylene glycol methylvinyl ether, polyethylene glycol divinyl ether, propylene glycol methylvinyl ether, dipropylene glycol monovinyl ether, dipropylene glycol methylvinyl ether, dipropylene glycol divinyl ether, tripropylene glycol monovinyl ether, tripropylene glycol methylvinyl ether, tripropylene glycol divinyl ether, polypropylene glycol monovinyl ether, polypropylene glycol methylvinyl ether, polypropylene glycol divinyl ether, tetramethylene glycol methylvinyl ether, di(tetramethylene glycol)monovinyl ether, di(tetramethylene glycol)methyl vinyl ether, di(tetramethylene glycol)divinylether, tri(tetramethylene glycol)monovinyl ether, tri(tetramethylene glycol) methylvinyl ether, tri(tetramethylene glycol)divinyl ether, poly(tetramethylene glycol)monovinyl ether, poly(tetramethylene glycol)methylvinyl ether, poly(tetramethylene glycol)divinyl ether, 1,6-hexanediolmethyl vinyl ether, di(hexamethylene glycol)monovinyl ether, di(hexamethylene glycol)methylvinyl ether, di(hexamethylene glycol)divinyl ether, tri(hexamethylene glycol)monovinyl ether, tri(hexamethylene glycol)methylvinyl ether, tri(hexamethylene glycol) divinyl ether, poly(hexamethylene glycol)monovinyl ether, poly(hexamethylene glycol)methylvinyl ether, poly(hexamethylene glycol)divinyl ether.

In a preferred embodiment, the energy curable monomer and/or oligomers are in a range between about 1% and about 100%, more preferably between about 5% and about 95%, and most preferably between about 10% and about 90% by weight of the total ingredients of the protective coating.

In another preferred embodiment, the energy curable protective coating is clear or free of pigment. In yet another preferred embodiment, the energy curable protective coating is dyed or contains organic or inorganic pigments.

The types of actinic radiation to polymerize the protective coating for the printed packaging materials of the present invention may be an electron beam, or a UV light, and the like. In a preferred embodiment, the energy source for photo-polymerization is an electron beam. Preferably, an electron beam dose necessary for curing of the ink ranges between about 0.5 to about 8 Mrads, more preferably about 1 to about 6 Mrads, and most preferably about 1.3 to about 4 Mrads. An electron beam acceleration voltage ranges preferably about 30-200 kV, more preferably 60-165 kV, and most preferably about 70-140 kV. During the electron-beam curing of the ink, an inert environment is provided by nitrogen gas, resulting in preferably less than about 600 parts per million (ppm), more preferably less than about 400 ppm, and most preferably less than about 200 ppm, of $O_2$ present in the environment. In another preferred embodiment, the energy source for photopolymerization of the protective coating is UV light. The appropriate UV light intensity is in the range of about 20 to about 10,000 mJ/cm$^2$, preferably about 40 to about 1,000 mJ/cm$^2$, and most preferably about 50 to about 700 mJ/cm$^2$.

4.5 Photoinitiator

Unless the second actinic radiation source is an electron beam, the energy curable resin for protective coating in the present invention will typically contain a photoinitiator that generates free radicals upon exposure to actinic radiation, such as UV light. Such a photoinitiator may have one or more compounds that directly produce free radicals when activated by actinic radiation. The photoinitiator may also contain a sensitizer or activator which either extends the spectral response into the near ultraviolet, visible or near infrared spectral regions, or affects the rate of reaction. In free radical initiated curing systems, irradiation of a photoinitiator produces free radicals that initiate polymerization and/or crosslinking of photocurable resins. Various types of photoinitiators are well known to one of ordinary skill in the art (see, for example, "Photoinitiators for free-radical-initiated photoimaging systems" by Monroe, B. M. et al., 1994, *Chem. Rev.* 93:435-448). Examples of photoinitiators suitable for the present invention include, but not limited to, organic halogen compound as disclosed in U.S. Pat. No. 5,057,398 and those disclosed in U.S. Pat. No. 4,066,582, such as benzophenone, acetophenone, fluorenone, xanthone, thioxanthone, carbazole, benzoin, the allyl benzoin ethers, 2- or 3- or 4-bromoacetophenone, 3- or 4-allylacetophenone, m- or p-diacetylbenzene, 2- or 3- or 4-methoxybenzophenone, 3,3'- or 3,4'- or 4,4'-dimethoxybenzophenone, 4-chloro-4'-benzylbenzophenone, 2- or 3-chloroxanthone, 3,9-dichloroxanthone, 2- or 3-chlorothioxanthone, 3-chloro-8-nonylxanthone, 3-methoxyanthone, 3-iodixanthone, 2-acetyl-4-methylphenyl acetate, alkyl and aryl ethers of benzoin, phenylglyoxal alkyl acetals, 2,2'-dimethoxy-2-phenyl-acetophenone, 2,2-diethoxyacetophenone, 2,2-diiso-propoxyacetophenone, 1,3-diphenyl acetone, naphthalene sulfonyl chloride, and mixtures thereof.

Suitable sensitizers or activators that can be used in combination with the aforementioned photoinitiators include, but not by way of limitation, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, N-cyclohexylethylenimine, piperidine, 2-methylpiperidine, N-ethylpiperidine, 1,2,3,4-tetrahydropyridine, 2- or 3- or 4-picoline, morpholine, N-methylmorpholine, piperazine, N-methylpiperazine, 2,2-dimethyl-1,3-bis-(3-N-morpholinyl)propionyloxy))diethyl ether, isopropylthioxanthone (ITX), dibutoxyanthracene, dipropoxyanthracene, and mixtures thereof.

In a preferred embodiment, the photoinitiator is in a range between about 0.1% and about 20%, more preferably between about 0.2% to 12%, and most preferably about 0.5% to 8%, by weight of the total weight of the coating.

5. EXAMPLES

The following examples illustrate the energy curable solvent-based liquid printing ink provided by the present invention. These examples should not be construed as limiting.

5.1 Example 1

A 75-μ thick opaque polyethylene film was coated with a solvent-based red ink (nitrocellulose/polyurethane based) and dried using a hot-air gun. Thereafter, a thin protective layer of EB curable coating was applied over the red-coated film with a #3 Meyer bar. This was EB-cured at 3 Mrads, 100 kV acceleration voltage and less than 200 ppm oxygen. The resultant glossy film has a 60-degree reflective gloss of 71-73% and had a solvent resistance of 17-20 MEK double rubs. The face-to-face coefficient of friction (COF) was 0.39-0.40 static/0.31-0.42 kinetic as measured on a TMI (model 32-06; Testing Machine Instruments, Amityville, N.Y.) slip friction tester. The residual solvent as measured by GC-headspace was 593 mg/ream (1 ream=3000 square feet of the film).

5.2 Example 2

A 75-μ thick opaque polyethylene film was coated with a solvent-based red ink (nitrocellulose/polyurethane based) and dried using a hot air gun. Immediately thereafter, the coated film was subjected to 250 mj/cm$^2$ of UV. A thin protective layer of EB-curable coating was applied over the red-coated film with a #3 Meyer bar. This was EB-cured at 3 Mrads, 100 kV acceleration voltage and less than 200 ppm oxygen. The resultant glossy film has a 60-degree reflective gloss of 71-73% and had a solvent resistance of 24-32 MEK double rubs. The face-to-face COF was 0.39-0.40 static/0.31-0.32 kinetic as measured on a TMI slip friction tester. The residual solvent as measured by GC-headspace was 402 mg/ream.

The results of the above two (2) examples are summarized in Table 1 below.

TABLE 1

|  | MEK rubs | Residual Solvent | COF | 60° Gloss |
| --- | --- | --- | --- | --- |
| Example 1 (no UV activation) | 17-20 | 593 mg/ream | 0.39-0.40/ 0.31-0.32 | 71-73 |
| Example 2 (UV activation) | 24-32 | 402 mg/ream | 0.39-0.40/ 0.30-0.31 | 71-73 |

5.3 Example 3

A 50-μ thick polypropylene film is coated with a solvent-based blue ink (polyurethane based) and dried using a hot-air gun. Immediately thereafter, the coated film is subjected to 100 mJ/cm$^2$ of UV. A thin protective layer of polyester acrylate containing 5% benzophenone (photoinitiator) is applied over the blue-coated film with a #3 Meyer bar. The protective coating is then cured by UV light at 500 mJ/cm$^2$.

5.4 Example 4

A 50-μm thick polyolefin foil laminated paper film is coated with a solvent-based red ink (polyurethane based) and dried using a hot-air gun. Immediately thereafter, the coated film is subjected to 330 mJ/cm$^2$ of UV. A thin protective layer of EB-curable coating, containing a red pigment, is applied over the red-coated film with a #3 Meyer bar. This is EB-cured at 2 Mrads, 100 kV acceleration voltage and less than 200 ppm oxygen.

5.5 Example 5

A 80-μm thick paper plastic film laminate structure is coated with a water-based orange ink (acrylic based) and dried using a hot-air gun. Immediately thereafter, the coated film is subjected to 305 mJ/cm$^2$ of UV. A thin protective layer of EB-curable coating is applied over the orange-coated film with a #3 Meyer bar. This is EB-cured at 1.5 Mrads, 100 kV acceleration voltage and less than 200 ppm oxygen.

5.6 Example 6

A 50-μm thick polyolefin foil laminated paper film is coated with a photoinitiator-free solvent-based red ink (polyurethane based) and dried using a hot-air gun. Immediately thereafter, the coated film is subjected to an EB at 2 Mrads, 100 kV acceleration voltage and less than 200 ppm oxygen. A thin protective layer of UV-curable coating, containing a photoinitiator, is applied over the red-coated film with a #3 Meyer bar. This is UV-cured at 330 mj/cm$^2$.

6. EQUIVALENTS

Those skilled in the art will recognize, or be able to ascertain many equivalents to the specific embodiments of the invention described herein using no more than routine experimentation. Such equivalents are intended to be encompassed by the following claims.

All publications and patents mentioned in this specification are herein incorporated by reference into the specification.

What is claimed is:

1. A method of producing a printed packaging material comprising, in sequence:
    applying an actinic radiation activatable liquid ink to a packaging material;
    exposing the ink to first actinic radiation;
    applying an energy-curable coating over the ink; and
    curing the coating with second actinic radiation;
    wherein the ink is substantially free of curable functionality,
    wherein the exposure to the first actinic radiation and curing with the second actinic radiation is such that the packaging material contains less than 700 ppm total of residual solvent or water, and
        wherein the exposure to the first actinic radiation and curing with the second actinic radiation is such that the packaging material has a degree of cure of at least 5 MEK rubs.
2. The method of claim 1, wherein the packaging material is a thermoplastic flexible film, and wherein a to-be-packaged substance is enclosed within the plastic film subsequent to the actinic radiation curing thereof.
3. The method of claim 1, wherein the packaging material is a foil laminate paper or paper plastic laminate, and wherein a to-be-packaged substance is enclosed within the plastic film subsequent to the actinic radiation curing thereof.
4. The method of claim 1, wherein the first actinic radiation is UV light.
5. The method of claim 1, wherein the second actinic radiation is an electron beam.

6. The method of claim 1, wherein the second actinic radiation is UV light.

7. The method of claim 1, wherein the energy-curable coating is free of pigment.

8. The method of claim 1, wherein the liquid ink is applied more than once.

9. The method of claim 1, wherein the liquid ink is solvent-based.

10. The method of claim 1, wherein the liquid ink is water-based.

11. A method of producing a printed packaging material comprising, in sequence:
   applying an actinic radiation activatable liquid ink to a packaging material;
   exposing the ink to first actinic radiation;
   applying an energy-curable coating over the ink; and
   curing the coating with second actinic radiation;
wherein the ink is substantially free of curable functionality, and
   wherein the actinic radiation activatable liquid ink is photoinitiator-free and the first actinic radiation is UV light, and wherein the exposure to the first actinic radiation and curing with the second actinic radiation is such that the packaging material contains less than 500 ppm total of residual solvent or water and a degree of cure of at least 20 MEK rubs.

12. The method of claim 11, wherein the packaging material is a thermoplastic flexible film, and wherein a to-be-packaged substance is enclosed within the plastic film subsequent to the actinic radiation curing thereof.

13. The method of claim 11, wherein the packaging material is a foil laminate paper or paper plastic laminate, and wherein a to-be-packaged substance is enclosed within the plastic film subsequent to the actinic radiation curing thereof.

14. The method of claim 11, wherein the first actinic radiation is UV light.

15. The method of claim 11, wherein the second actinic radiation is an electron beam.

16. The method of claim 11, wherein the second actinic radiation is UV light.

17. The method of claim 11, wherein the energy-curable coating is free of pigment.

18. The method of claim 11, wherein the liquid ink is applied more than once.

19. The method of claim 11, wherein the liquid ink is solvent-based.

20. The method of claim 11, wherein the liquid ink is water-based.

\* \* \* \* \*

UNITED STATES PATENT AND TRADEMARK OFFICE
CERTIFICATE OF CORRECTION

| | | |
|---|---|---|
| PATENT NO. | : 7,886,665 B2 | Page 1 of 1 |
| APPLICATION NO. | : 10/591336 | |
| DATED | : February 15, 2011 | |
| INVENTOR(S) | : Biro et al. | |

It is certified that error appears in the above-identified patent and that said Letters Patent is hereby corrected as shown below:

Title page, item [63] insert the following under Related U.S. Application Data:

--Provisional application No. 60/558,076, filed on March 31, 2004.--

Signed and Sealed this
Twenty-fourth Day of April, 2012

David J. Kappos
*Director of the United States Patent and Trademark Office*